(12) United States Patent
Joy (10) Patent No.: US 6,233,621 B1
(45) Date of Patent: *May 15, 2001

(54) SYSTEM AND METHOD FOR SPACE EFFICIENT HASHCODE ALLOCATION

(75) Inventor: William N. Joy, Aspen, CO (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/640,245

(22) Filed: Apr. 30, 1996

(51) Int. Cl.[7] .............................. G06F 9/00; G06F 9/46; G06F 15/163

(52) U.S. Cl. ................................ 709/315; 707/206

(58) Field of Search .................... 395/622, 650, 395/600, 615, 618; 364/900, 200; 709/310–332; 707/206, 7

(56) References Cited

U.S. PATENT DOCUMENTS

| | | | | |
|---|---|---|---|---|
| 4,695,949 | * | 9/1987 | Thatte et al. | 364/200 |
| 4,775,932 | * | 10/1988 | Oxley et al. | 364/200 |
| 4,996,663 | * | 2/1991 | Nemes | 364/900 |
| 5,287,499 | * | 2/1994 | Nemes | 707/2 |
| 5,321,834 | * | 6/1994 | Weiser et al. | 395/600 |
| 5,355,483 | * | 10/1994 | Serlet | 395/650 |
| 5,485,613 | * | 1/1996 | Engelstad et al. | 395/650 |
| 5,577,246 | * | 11/1996 | Priddy et al. | 395/618 |
| 5,652,883 | * | 7/1997 | Adcock | 395/622 |
| 5,692,185 | * | 11/1997 | Nilsen et al. | 395/615 |
| 5,802,590 | * | 9/1998 | Draves | 711/164 |

OTHER PUBLICATIONS

Ekow Otoo, "Balanced Multidimensional extendible hash tree", ACM digital library, 1986.*
Hirano et al, "Extendible hashing for concurrent insertions and retrievals", IEEE electronic library, 1996.*
Kyoji kawagoe, "Modified dynamic hashing", ACM digital library, 1985.*
Flat et al, "Nonoblivious hashing", ACM digital library, 1992.*
Isabelle Puaut, "Distributed Garbage Collector for Active Objects", OOPSLA, 1994.*
Kafura et al, "Concurrent and Distributed Garbage Collection of Active Objects", IEEE Transactions on Parallel and Distributed Systems, vol. 6, No. 4, Apr. 1995.*

* cited by examiner

Primary Examiner—Majid A. Banankhah
Assistant Examiner—P. G. Caldwell
(74) Attorney, Agent, or Firm—Pennie & Edmonds LLP (57) ABSTRACT

In summary, the present invention is a multithreaded computer system having a memory that stores a plurality of objects and a plurality of procedures. The system uses a first global hashing procedure to service requests for the hashcodes of objects that do not have hashcodes, a local object-specific hashing procedure to service requests for hashcodes that have a recently generated hashcode, and a second global hashing procedure to service requests for the hashcodes of objects that have their hashcodes stored with the object. The global object hashing procedure has instructions for creating for each object a local object-specific hashing procedure. The local object hashing procedure includes as private data a hashcode and instructions for retrieving the hashcode. The second global hashing procedure includes instructions for retrieving the hashcode from the object. A hashcode cleanup procedure, executed during the system's garbage collection process, releases the local object-specific hashing procedure of an object and stores the hashcode with the object.

27 Claims, 8 Drawing Sheets

SYSTEM AND METHOD FOR SPACE EFFICIENT HASHCODE ALLOCATION

The present invention relates generally to object-oriented computer systems associating a unique identifier to an object, and particularly to a system and method for efficiently allocating hashcodes to objects in a system where most or all objects are hashable, but relatively few objects are in fact ever hashed.

BACKGROUND OF THE INVENTION

In object-oriented computer systems, system resources can be characterized in the form of an object. In some of these systems, the objects can be stored in arrays or tables and accessed through the use of keys. A key is a consistent value that identifies an object with respect to other objects and provides direct access to the object. Typically, hashcodes are utilized as keys.

Various approaches have been used to associate a hashcode with an object. In systems where the memory locations for objects are static, the memory location of the object is used as the hashcode. However, the use of the memory location as a hashcode cannot be applied to systems which relocate objects during a garbage collection process. Since the memory location of an object changes during the lifetime of an object, a hashcode that is dependent on a memory location could not provide a consistent value.

Another approach is to generate and store a hashcode with each object's data space. This approach is undesirable since it requires extra space in the object's data space which may never be utilized. While there may be a large number of objects which are hashable, most of them are not referenced by their hashcodes. As a result, this approach has the distinct disadvantage of requiring a large amount of memory.

It is an object of the present invention to provide a system and method for providing a hashcode for an object on an as-needed basis so as to avoid the allocation of memory space for hashcodes that are not referenced.

It is another object of the present invention to provide a system and method as described above that is computationally efficient and that imposes essentially no computational overhead for frequently hashed objects, and that uses storage resources that are proportional to the number of hashed objects.

It is another object of the present invention to provide a system and method as described above which provides a hashcode that identifies an object with respect to all the other objects, that is consistent for the duration of the object, and that is not based on the memory location of the object's data space.

It is another object of the present invention to provide a system and method as described above which provides a hashcode for an object in a concurrent processing environment.

SUMMARY OF THE INVENTION

In summary, the present invention is an object-oriented computer system having a memory that stores a plurality of objects and a plurality of procedures. An object can be represented as an object data structure, the first element of which is a methods pointer to a methods array. Each object is an instance of a class and has a data reference stored with its methods pointer to a class data structure associated with this class. The class data structure has a methods array of pointers to methods used by the class.

The system uses two global hashoode procedures for providing the hashcode of an object and a hashcode cleanup procedure for reclaiming storage used by one of the hashcode procedures. The system uses a first global hashing procedure to service the initial request for an object's hashcode. Initially, objects do not have associated hashcodes. The first global hashing procedure generates a relatively unique hashcode for the object and stores it as private data in a local object-specific hashing procedure. The local object-specific hashing procedure's function is to retrieve the hashcode from its private data. The local object-specific hashing procedure is generated for an individual object rather than for the object class. This is done in order to preserve the integrity of the object's data structure in a concurrent processing environment.

A hashcode cleanup procedure is invoked as part of a garbage collection method in order to reclaim storage used by the local object-specific hashing procedure. The hashcode cleanup procedure relocates the object's data space to an alternate memory location and stores the associated hashcode, if any, in the object's data structure. It then releases the memory space for the local object-specific hashing procedure. The system then uses a second global hashing procedure to retrieve the hashcode from the object's data structure.

In a preferred embodiment, each object that does not have a hashcode (i.e. has not had a request for the object's hashcode) has a methods pointer that references a set of procedures that includes the first global hashing procedure. Each object that has been allocated a local object-specific hashing procedure has a methods pointer that references a set of procedures that includes its local object-specific hashing procedure. Objects that have hashcodes stored in the object's data structure each have a methods pointer that references the second global hashing procedure.

Furthermore, the first global hashing procedure includes instructions for updating a specified object's methods pointer to point to a set of procedures that includes the local object-specific hashing procedure. The hashcode cleanup procedure includes instructions for updating a specified object's methods pointer to point to a set of procedures that includes the second global hashing procedure.

More specifically, in a preferred embodiment, the computer system includes a set of object classes, and each object class includes a primary virtual function table (VFT) that includes pointers referencing a set of methods associated with the object class as well as a pointer that references the first global hashing procedure. Each object that does not have a hashcode has a methods pointer that references the primary VFT for a corresponding object class.

For each object that has a local object-specific hashing procedure, the system stores a local virtual function table (VFT) that includes pointers referencing the set of methods associated with its object class as well as a pointer that references that object's local object hashing procedure. The first global hashing procedure includes instructions for updating a specified object's methods pointer to reference its local VFT.

For each object class, the system stores a secondary virtual function table (VFT) that includes pointers referencing the set of methods associated with its object class as well as a pointer that references the second global hashing procedure. The second global hashing procedure includes instructions for retrieving the hashcode from the object's data structure. The hashcode cleanup procedure includes instructions for updating an object's methods pointer to reference the secondary VFT.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

The present invention pertains to a system and method for allocating hashcodes to objects in a space efficient manner. The hashcodes are used to identify an object in order to access the object in a time efficient manner. As most objects are hashable but relatively few are hashed, the system and method allocates a hashcode for an object on an as-needed basis. Further, the hashcode values remain constant through the lifetime of an object even though the memory location of the object's data space is altered due to storage reclamation and the like.

The present invention can be utilized in a multiprocessing environment having multiple threads of execution. In such an environment, precautions are used to preserve the integrity of the object's data space. Concurrent procedures which alter the internal structure of the object's data space need to be synchronized with one another. In addition, another level of precaution needs to be taken to account for the simultaneous use of an object by an asynchronous thread and a synchronous thread which alters the object's data space. In this case, a per-object hashing procedure and a local virtual function table (VFT) are generated to store the hashcode thereby preserving the original object's data structure for use by the concurrent asynchronous thread. The object's data structure is then altered to store the hashcode with the object during the hashcode cleanup procedure when no concurrent references are made to the object.

Figure 1:
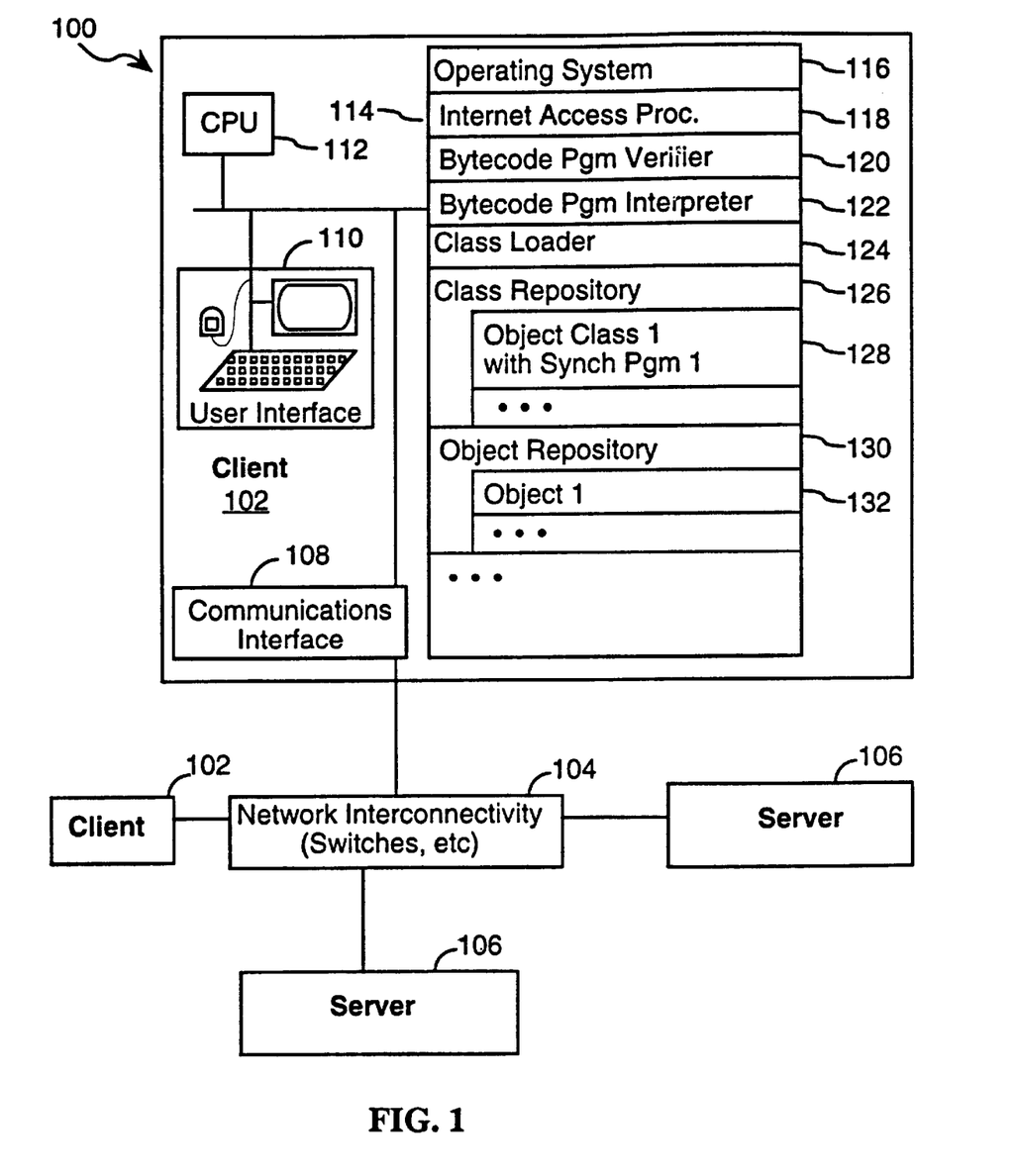
FIG. 1 is a block diagram of a computer system incorporating a preferred embodiment of the present invention.

Referring to FIG. 1, there is shown a distributed computer system 100 having multiple client computers 102 and multiple server computers 106. In the preferred embodiment, each client computer 102 can be connected to the servers 106 via the Internet 104, although other types of communication connections could be used. While most client computers can be desktop computers, such as Sun workstations, IBM compatible computers and Macintosh computers, virtually any type of computer can be a client computer. One or more users (not shown) are associated with each client computer 102. It should be noted that the present invention is not limited to a distributed computer system. It may be practiced without the specific details and may be implemented in various computer systems and in various configurations, or makes or models of tightly-coupled processors or in various configurations of loosely-coupled microprocessor systems.

In the preferred embodiment, each client computer can include a CPU 112, a communications interface 108, a user interface 110, and memory 114. Memory 114 can store:

an operating system 116;

Internet access procedures 118;

a bytecode program verifier 120 for verifying whether or not a specified program satisfies certain predefined integrity criteria;

a bytecode program interpreter 122 for executing application programs;

a class loader 124, which loads object classes into a user's address space and utilizes the bytecode program verifier to verify the integrity of the methods associated with each loaded object class;

at least one class repository 126, for locally storing object classes 128 in use and/or available for use by users of the computer 102;

at least one object repository 130 for storing objects 132, which are instances of objects of the object classes stored in the object class repository 126.

In the preferred embodiment the operating system 116 can be an object-oriented multitasking operating system that supports multiple threads of execution within each defined address space. The operating system furthermore can use a garbage collection procedure to recover the storage associated with released data structures. The garbage collection procedure can be automatically executed on a periodic basis, and can also be automatically invoked at additional times when the amount of memory available for allocation falls below a threshold level. For the purposes of this document it may be assumed that all objects in the system 132 are hashable objects, although in practice relatively few objects are actually ever hashed.

The class loader 124 is typically invoked when a user first initiates execution of a procedure, requiring that an object of the appropriate object class be generated. The class loader 124 loads in the appropriate object class and calls the bytecode program verifier 120 to verify the integrity of all the bytecode programs in the loaded object class. If all the methods are successfully verified an object instance of the object class is generated, and the bytecode interpreter 122 is invoked to execute the user requested procedure, which is typically called a method. If the procedure requested by the user is not a bytecode program and if execution of the non-bytecode program is allowed (which is outside the scope of the present document), the program is executed by a compiled program executer (not shown).

The class loader 124 is also invoked whenever an executing bytecode program encounters a call to an object method for an object class that has not yet been loaded into the user's address space. Once again the class loader 124 loads in the appropriate object class and calls the bytecode program verifier 122 to verify the integrity of all the bytecode programs in the loaded object class. In many situations the object class will be loaded from a remotely located computer, such as one of the servers 106 shown in FIG. 1. If all the methods in the loaded object class are successfully verified, an object instance of the object class is generated, and the bytecode interpreter 122 is invoked to execute the called object method.

Data Structures for the Objects

Figure 2:
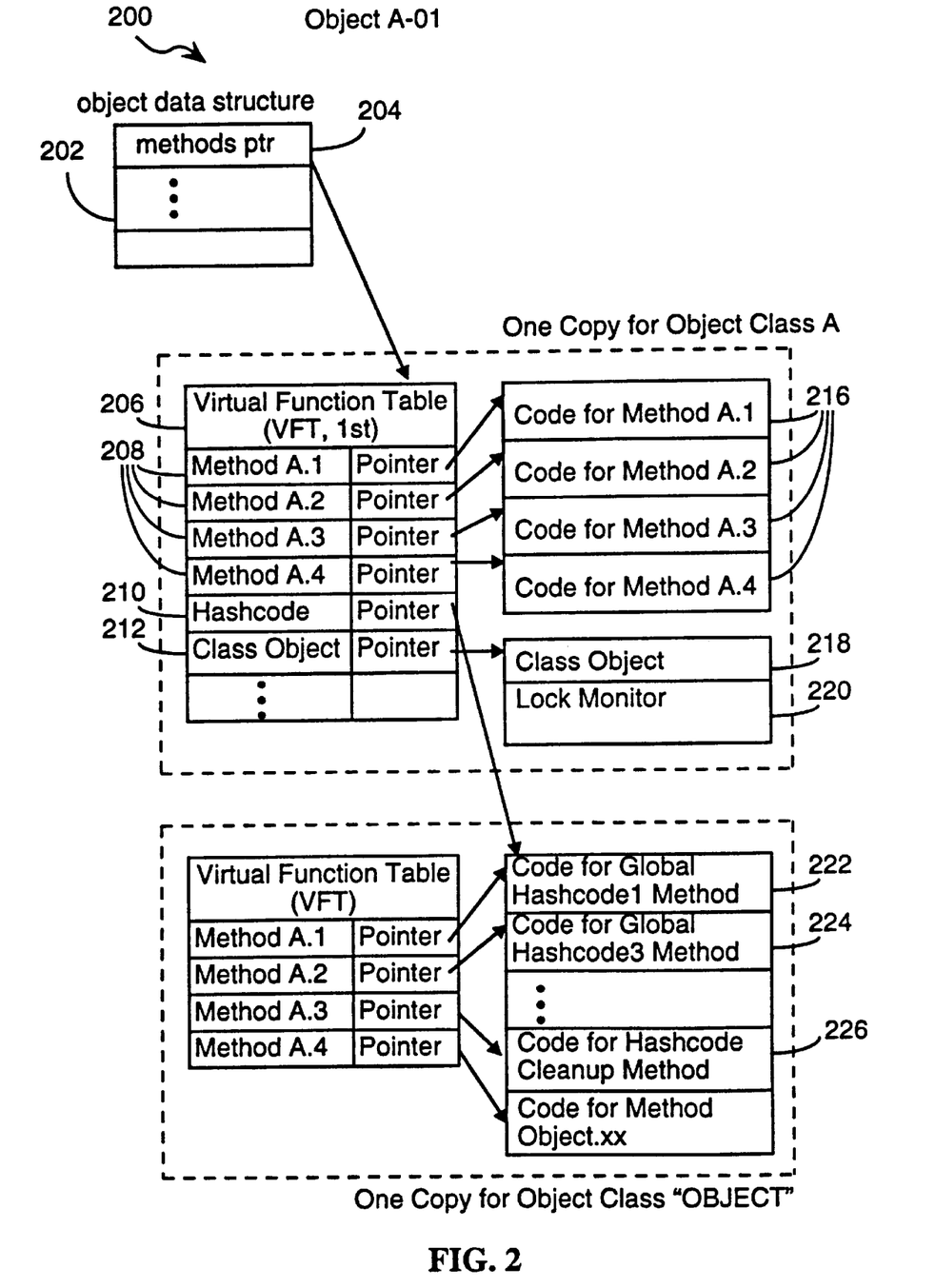
FIG. 2 is a block diagram of the data structure for an object that does not have a hashcode in a preferred embodiment of the present invention.

FIG. 2 shows the data structure 200 in a preferred embodiment of the present invention for an object that does not have a hashcode. Initially, all objects do not have associated hashcodes. A hashcode is generated for an object at the first request for the object's hashcode.

Referring to FIG. 2, an object of object class A can have an object data structure 202 that includes a pointer 204 to the methods for the object 200. The pointer 204 to the object's methods is actually an indirect pointer to the methods of the associated object class. More particularly, the methods pointer 204 points to the primary Virtual Function Table (VFT) 206 for the object's object class. Each object class can have a primary VFT 206 that includes: (A) pointers 208 to each of the methods 216 of the object class; (B) a pointer 210 to a first global hashcode method (Global Hashcode1) 222 for assigning a hashcode to an object; and (C) a pointer 212 to a special Class Object 218 that is used to synchronize concurrent accesses to the object. There can be one Class Object 218 for each defined object class, and the Class Object can include a permanently allocated lock data sub-array (otherwise referred to as a lock monitor) 220.

As shown in FIG. 2, there is only one copy of the primary VFT 206 and the object methods 216 for the entire object class A, regardless of how many objects of object class A may exist. Furthermore, the first global hashing procedure (Global Hashcode1) 222, a second global hashing procedure (Global Hashcode3) 224, and a Hashcode CleanUp procedure 226 are methods of the "Object" object class, which is the object class at the top of object class hierarchy in the preferred embodiment.

The term "relatively unique" Z is defined for the purposes of this document to mean a value, such as a hashcode, that is usually unique, but is on rare occasions not unique. However, non-unique hashcodes are easily resolved or distinguished because the associated hashcode table will generally include information indicating which entry in the table corresponds to the specified object. For the purposes of this document, the terms unique and relatively unique will be used interchangeably.

The Global Hashcode1 method 222 can be used to service requests to obtain the hashcode of an object which does not have a hashcode. Global Hashcode1 222 generates a local object-specific hashing procedure which stores as private data a relatively unique hashcode for the object. The local object-specific procedure retrieves the hashcode from its private data. FIG. 2 also shows that the "Object" object class also includes a second global hashcode procedure 224 (Global Hashcode3), and a Hashcode CleanUp procedure 226 for reclaiming storage used by the first global hashing procedure. It should be pointed out that the three hashing-related methods 222, 224, and 226 could be implemented as the methods of any object class known to be available in all systems using the methodology of the present invention, and do not need to be part of the "Object" object class.

Figure 3:
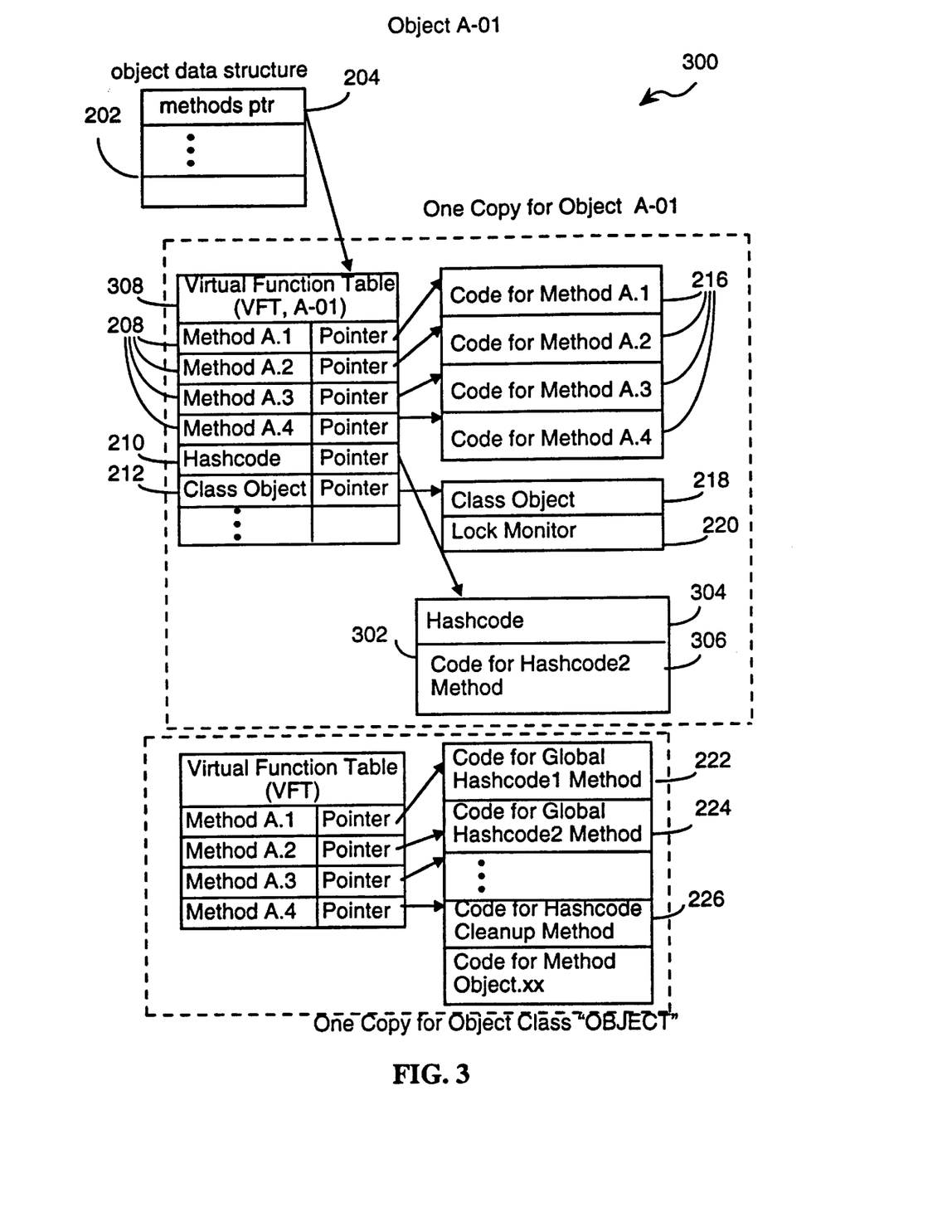
FIG. 3 is a block diagram of the data structure for an object that has a local object-specific hashing procedure in a preferred embodiment of the present invention.

FIG. 3 shows the data structure 300 for an object, A-01, having a hashcode accessible by its methods pointer. An object having a recently generated hashcode has an object data structure 202 having a methods pointer 204 that points to a local object-specific version of the Virtual Function Table 308 (VFT, A-01). Each object having a recently generated hashcode has a local VFT (VFT, A-01) 308 that can include: (A) pointers 208 to each of the methods 216 of the object class; (B) a pointer 210 to a local object-specific hashing procedure 302; and (C) a pointer 212 to a special Class Object 218 which can be used to synchronize concurrent accesses to the object.

Local object-specific hashing procedure 302 includes a hashcode 304 stored as private data and instructions (Hashcode2 Method) 306 for retrieving the hashcode 304 from the local object-specific hashing procedure 302. Local object-specific hashing procedure 302 can be used to service requests for the hashcode of an object having its hashcode stored in the local object-specific hashing procedure 302.

Figure 4:
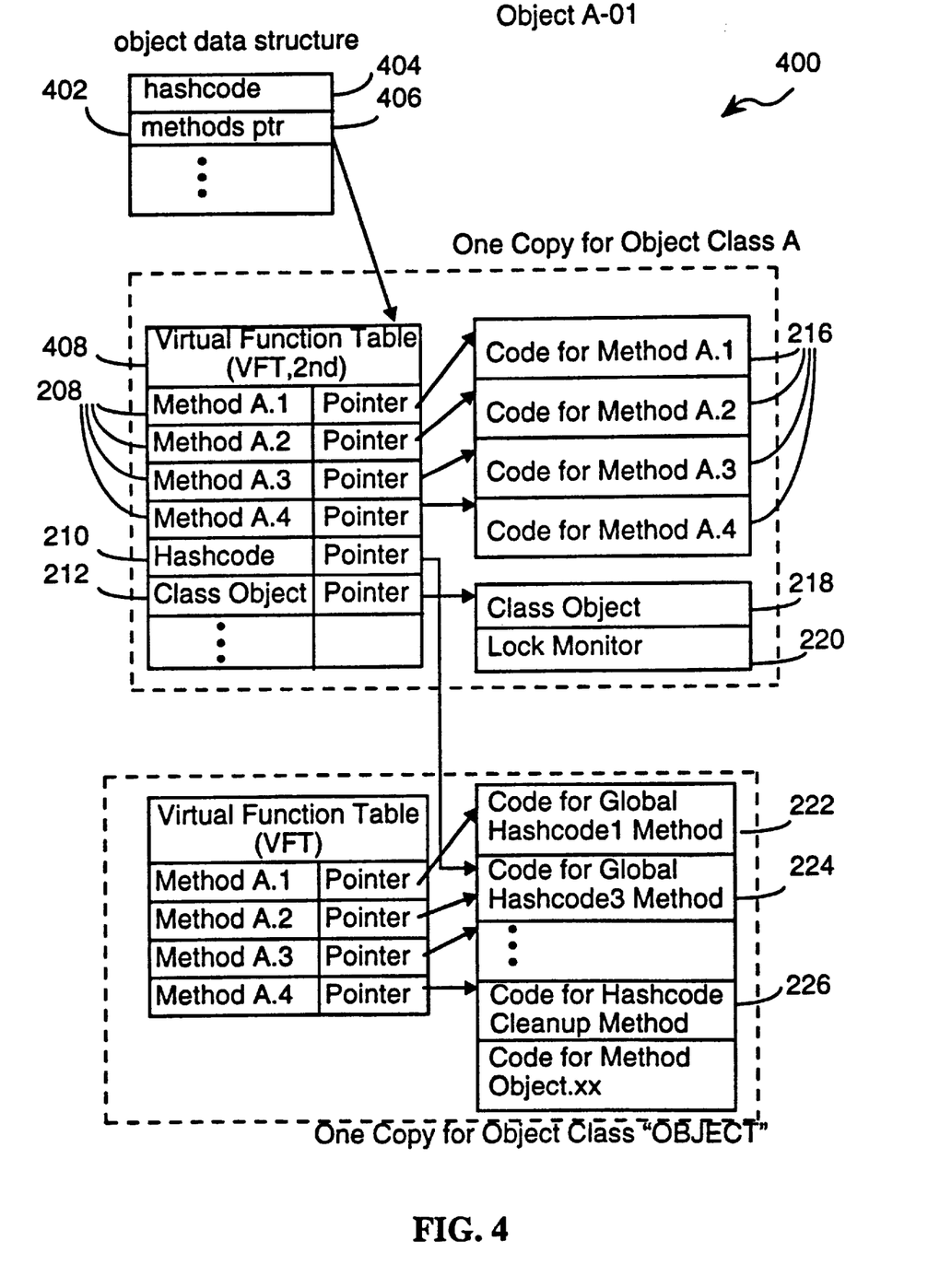
FIG. 4 is a block diagram of the data structure for an object that has a hashcode stored in the object's data structure in a preferred embodiment of the present invention.

FIG. 4 depicts the data structure 400 for an object having a hashcode stored in the object's data structure. Such an object can have an object data structure 402 having a hashcode 404 and a methods pointer 406 to a secondary version of the Virtual Function Table 408 (VFT, 2nd). Each object class has a secondary VFT (VFT, 2nd) 408 that includes: (A) pointers 208 to each of the methods 216 of the object class; (B) a pointer 210 to a second global hashing procedure (Global Hashcode3) 224 used for retrieving the object's hashcode 404; and (C) a pointer 212 to a special Class Object 218 that is used to synchronize concurrent accesses to the object.

The second global hashing procedure, Global Hashcode3, 224 can be used to service requests for the hashcodes of objects whose hashcodes are stored in the object's data structure 402. An object's hashcode is stored in an object's data structure once the object has been relocated by the Hashcode CleanUp procedure 226.

The Object Locking Methodology

Each computer system, such as a client computer 102, has many objects, each having an associated object class. Every object is said to be an instance of its associated object class. Each object class inherits properties from its superclass, and every object class is a subclass of a top level object class called the "Object" object class.

For each object class that exists in a particular address space, there is usually a virtual function table (VFT) that contains a list of all the methods (i.e., executable procedures) associated with the object class as well as a pointer to each of those methods. In the preferred embodiment, there are two VFTs for each object class, a primary VFT and a secondary VFT, as well as a local VFT for each object that has a local object-specific hashing procedure. The difference between the various VFTs is the particular hashcode procedure that is referenced. For each object that does not have a hashcode, the default VFT, or "primary" VFT, for the object's object class, is utilized. The primary VFT references the first global hashing procedure. The local VFT references the local object-specific hashing procedure and the secondary VFT references the second global hashing procedure.

Figure 5:
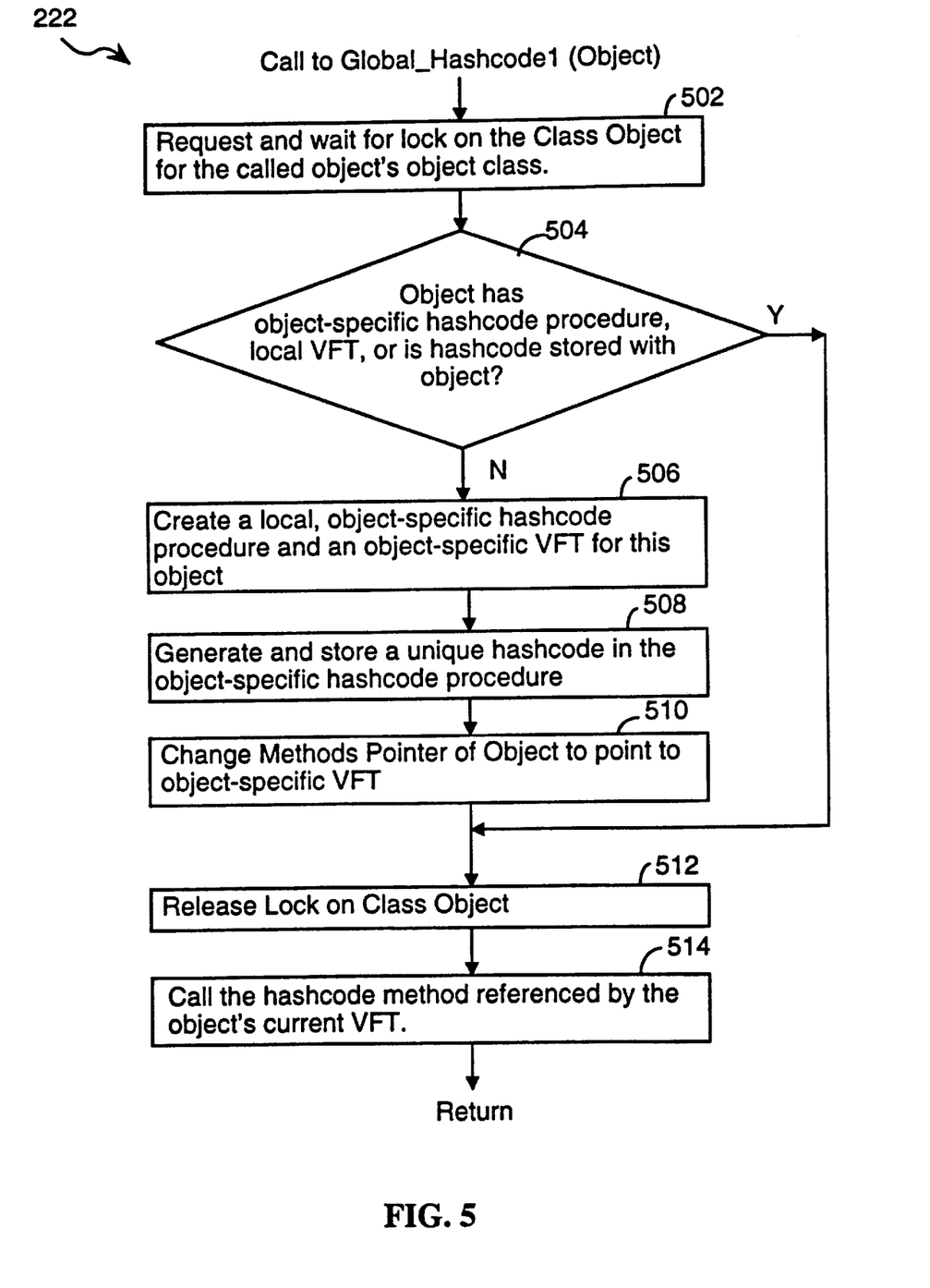
FIG. 5 is a flow chart of the procedure for the first global hashing procedure in a preferred embodiment of the present invention.

Referring to FIG. 5, when a request for an object's hashcode is made and the hashcode does not exist, the Global Hashcode1 procedure 222 is invoked. The Global Hashcode1 method 222 begins by requesting and waiting for a lock 220 on the Class Object 218 associated with the object to be hashed (step 502). This is done in order to synchronize the first global hashing procedure with other concurrent activities that may alter the structure of the object's data space. The remainder of the Global Hashcode1 method is not executed until the thread making the Global Hashcode1 method call obtains a lock on the Class Object.

The Global Hashcode1 and Hashcode CleanUp methods need to be synchronized, by acquiring a lock on the Class Object, to prevent against corruption due to concurrency. For example, in a multiprocessor system, the Global Hashcode1 procedure could be simultaneously invoked by two processors on the same object at the same time. Unless precautions are taken, this could result in the creation of the two local VFTs and two local object-specific hashing procedures for the same object. To solve this problem it is necessary in the Global Hashcode1 and the Hashcode CleanUp procedures to lock the Class Object for the class of the specified object while rearranging the specified object's internal data space.

After obtaining a lock on the Class Object, a check can be made as to whether the object has a local object-specific hashing procedure and a local or object-specific VFT, or a hashcode in the object's data structure (step 504). The existence of any of these structures indicates that the object has an associated hashcode. If any of these structures exist (step 504-Y), the method proceeds to step 512. Otherwise, the Global Hashcode1 method creates a local object-specific hashing procedure that includes a hashcode and instructions for retrieving the hashcode from the local object-specific hashing procedure (step 506). Additionally, the Global Hashcode1 method creates a local object-specific VFT (step 506).

The hashcode is stored in the dynamically-allocated local object-specific hashing procedure in order to prevent corruption due to concurrent processing. For example, threads that reference an object without altering the object's internal structure do not require any synchronization. If the Global Hashcode1 procedure attempted to change the object's data structure to include the hashcode (e.g., dynamically allocating another object data structure and copying the contents of the old object data structure into the new one along with the hashcode) while the asynchronous thread was referencing the object, the asynchronous thread's object reference would be corrupted. Accordingly, the hashcode is stored without changing or moving the object's data structure.

Next, Global Hashcode1 generates a hashcode for the object that is relatively unique to the object with respect to all the other objects, which remains constant throughout the lifetime of the object, and which is independent of the memory location of the object (step 508). The hashcode is stored in the local object-specific hashing procedure (step 508). The methods pointer of the object can then be altered to point to the local, object-specific VFT (step 510). Further, the lock on the Class Object is released (step 512).

The hashcode procedure referenced by the object's current VFT is then called (step 514). In the preferred embodiment, this is accomplished by modifying the context information for the thread so that when a return from the Global Hashcode1 method is performed, the hashcode method call that invoked the Global Hashcode I method is performed a second time.

Figure 6:
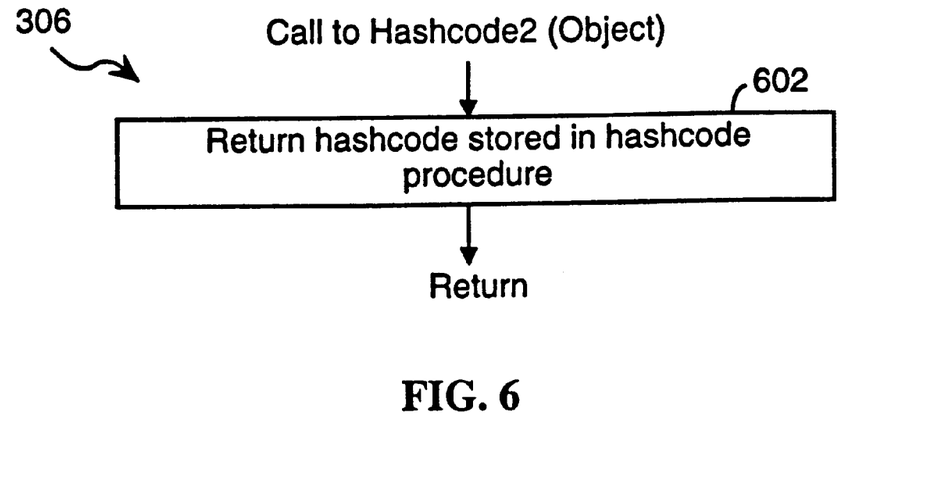
FIG. 6 is a flow chart of the procedure for the local object-specific hashing procedure in a preferred embodiment of the present invention.

FIG. 6 illustrates the steps used in the local object-specific hashing procedure. Hashcode2 306 can be invoked when requests are made for the hashcode of objects having a local object-specific hashing procedure. In this case, the Hashcode2 method retrieves the hashcode stored as private data in the local object-specific procedure (step 602).

Figure 7:
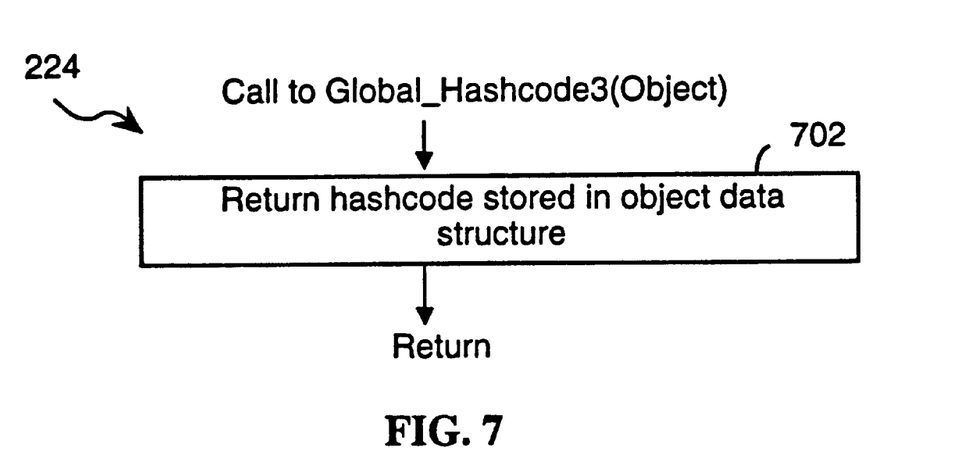
FIG. 7 is a flow chart of the procedure for the second global hashing procedure in a preferred embodiment of the present invention.

FIG. 7 illustrates the steps used in the second global hashing procedure. Global Hashcode3 224 can be invoked when requests are made for the hashcode of objects having a hashcode stored with the object. In this case, the Global Hashcode3 method retrieves the hashcode stored in the object's data structure (step 702).

Figure 8:
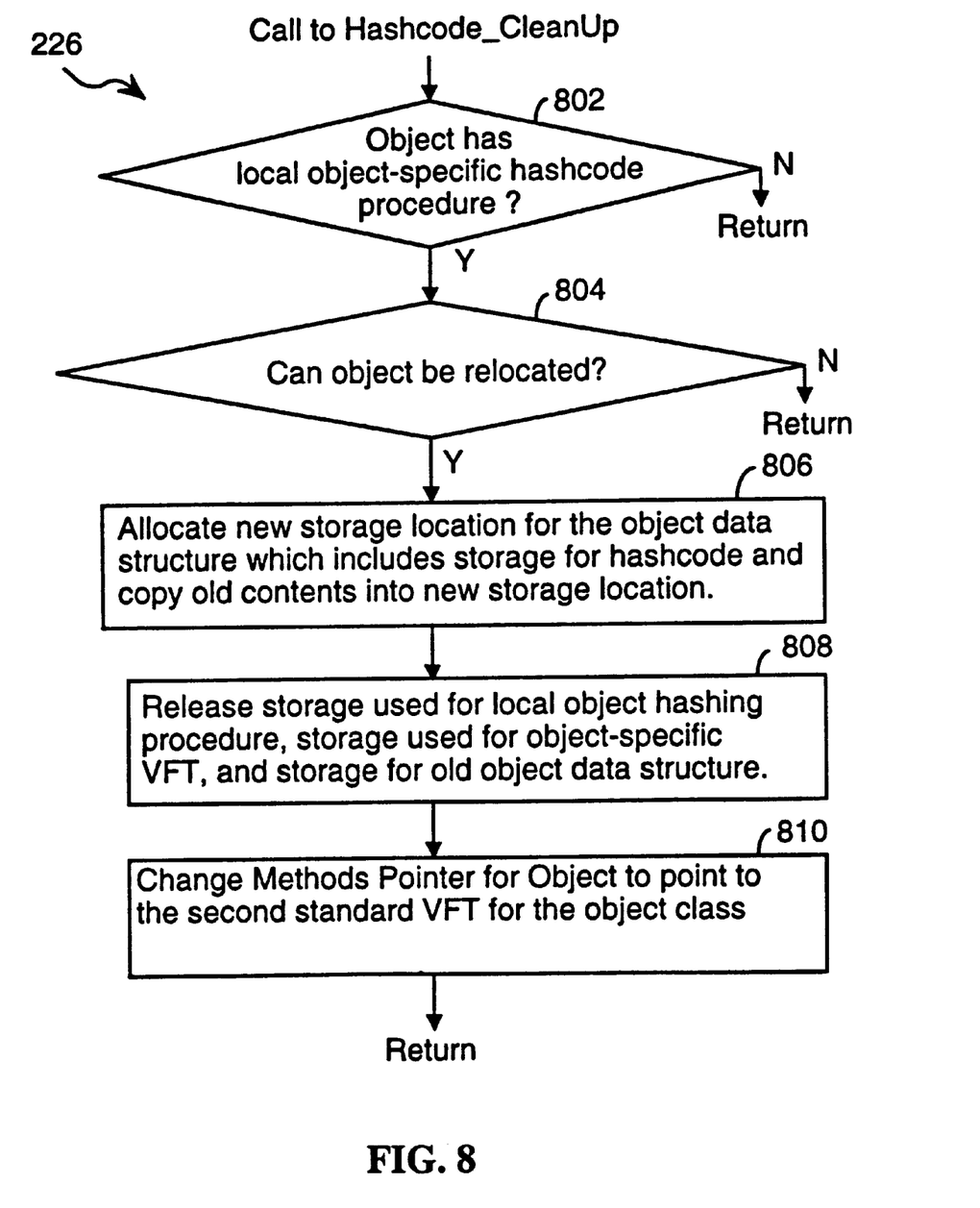
FIG. 8 is a flow chart of a preferred embodiment of a hashcode cleanup method.

FIG. 8 depicts a first preferred embodiment for the Hashcode CleanUp method which can be used in conjunction with a garbage collection procedure and in an environment that does not require synchronization with other concurrent activities. The Hashcode CleanUp method relocates an object's data structure to an alternate memory location. The object's data structure is expanded to include additional storage for the hashcode. Storage for the object-specific VFT and the object-specific hashing procedure is released and the methods pointer is set to the secondary VFT which utilizes the second global hashing procedure to service hashcode requests. The Hashcode Cleanup method can be called repeatedly for various objects.

Referring to FIG. 8, a check is made to determine whether the object has a local object-specific hashing procedure (step 802). If none exists, then the object either has no associated hashcode or has its hashcode already stored with the object. In this situation, the method returns (step 802-N). Otherwise, a check can be made to determine whether the object can be relocated (step 804). Objects may not be relocated if they are being referenced by other threads. If the object cannot be relocated, the method returns (step 804-N). Otherwise, the method continues by relocating the object's data structure to a new storage location which includes additional storage to include the hashcode, preferably an additional word before the beginning of the object's data structure (step 806). The hashcode is then stored in the object's data structure (step 806). Additionally, the contents of the old object data structure are stored in the newly allocated object data structure 402 (step 806).

Next, the storage allocated for the local object-specific hashing procedure, the local VFT, and the old object data structure is released (step 808). The methods pointer of the object's data structure is updated to point to the secondary VFT which utilizes the second global hashing procedure as the hashcode method (step 810).

Figure 9:
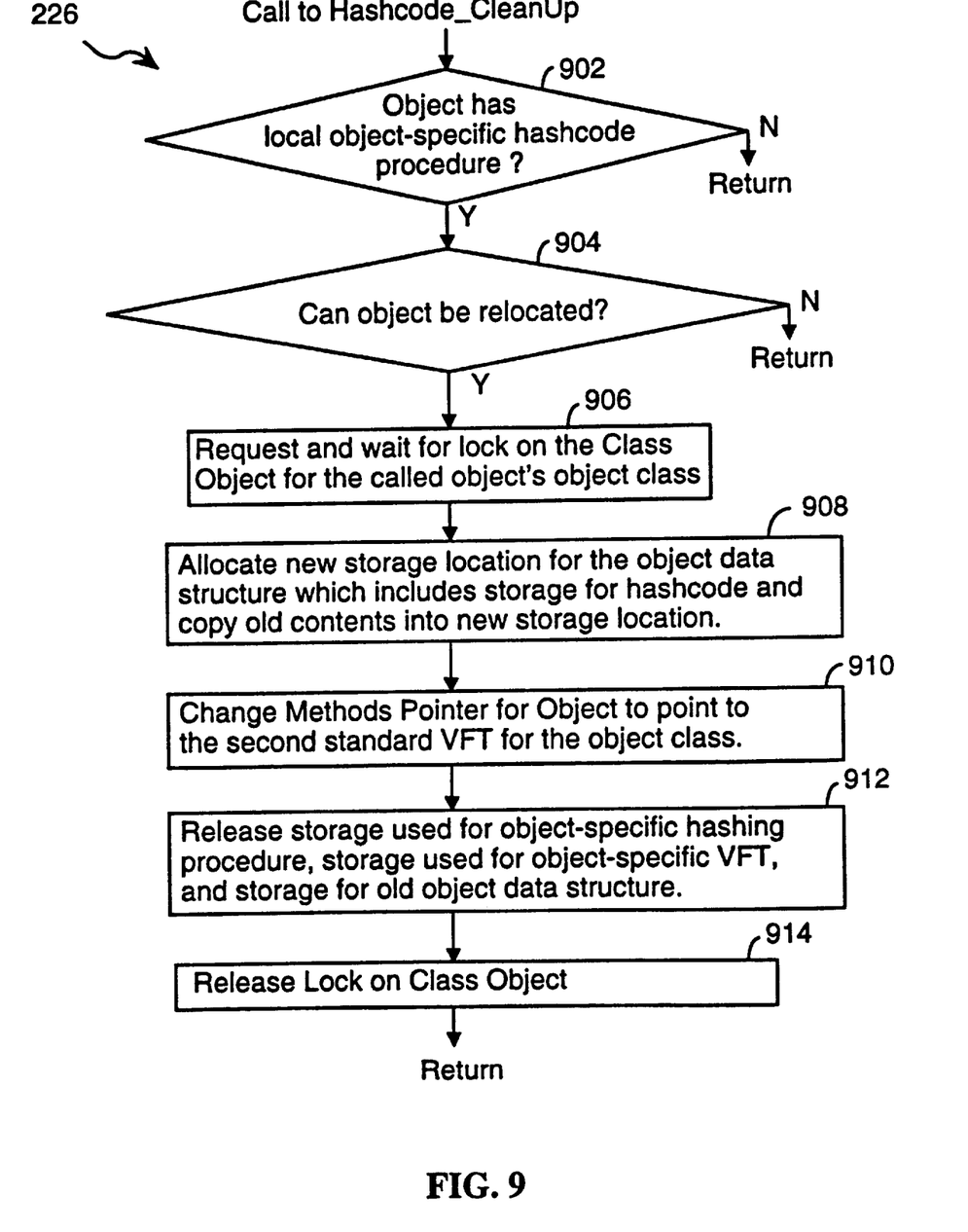
FIG. 9 is a flow chart of an alternate embodiment of a hashcode cleanup method.

FIG. 9 depicts an alternate embodiment of the Hashcode CleanUp procedure which can be used in concurrent processing environments. In this embodiment, the Hashcode CleanUp method can be synchronized with other concurrent thread activities which alter the object's data structure. Referring to FIG. 9, a check can be made to determine whether the object has a local object-specific hashing procedure (step 902). If none exists, then the object either has no associated hashcode or has its hashcode already stored with the object. In this situation, the method returns (step 902-N). Otherwise, a check can be made to determine whether the object can be relocated (step 904). Objects may not be relocated if they are currently referenced by other threads. If the object cannot be relocated, the method returns (step 904-N). Otherwise, the method requests and waits for a lock on the Class Object associated with the object to be hashed (step 906). This is done in order to synchronize the Hashcode CleanUp method with other concurrent activities which may alter the structure of the object's data space. The remainder of the Hashcode CleanUp method is not executed until the thread making the Hashcode CleanUp method call obtains a lock on the Class Object.

Once the lock on the Class Object is obtained, the method continues by relocating the object's data structure to a new storage location which includes additional space to include the hashcode, preferably before the beginning of the object's data structure (step 908). The hashcode can be stored in the object's data structure (step 908). Additionally, the contents of the old object data structure are stored in the newly allocated object data structure (step 908).

The methods pointer of the object's data structure is updated to point to the secondary VFT which utilizes the second global hashing procedure as the hashcode method (step 910). Next, the storage allocated for the local object-specific hashing procedure, the local VFT, and the old object data structure is released (step 912). Lastly, the lock on the class object is released (step 914).

The above mentioned invention pertains to a system and method for associating hashcodes to objects in a space efficient manner. Hashcodes are generated for an object on an as-needed basis. The hashcodes identify an object with respect to other objects in a consistent manner without reference to the storage location of an object and for the duration of the object. Further, the system and method accommodates concurrent processing environments in a computationally efficient manner. The hashcodes are initially stored separately from the object, thereby allowing concurrent access to the object while the hashcode is generated. At a later time when exclusive access to the object is obtained, the hashcode is stored with the object.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For example, while the present invention has been described with reference to the use of hashcodes, any mechanism which identifies an object can be employed in lieu of the hashcodes. Additionally, the Hashcode CleanUp procedure need not be performed during the garbage collection phase. It can be executed at any time when there are no threads referencing an object.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

What is claimed is:

1. An object-oriented computer system, comprising:
   a memory for storing a plurality of objects and a plurality of procedures, each stored object having a methods pointer to a subset of the procedures;
   a key generating procedure for generating a key for a specific object that does not have a key associated therewith, the key identifying the specified object with respect to all other objects, the key generating procedure storing the key in a memory location external to the specified object and accessible through the specified object's methods pointer;
   a key cleanup procedure for relocating stored objects to alternate memory locations, said key cleanup procedure including instructions for resizing a stored object having an associated key stored in a memory location external to the stored object, wherein the associated key is accessible through the stored object's methods pointer, the object being resized so as include additional room for storage of the associated key within the object, and instructions for storing the associated key at a predefined location within the stored object;
   a key retrieval procedure for retrieving a key of a stored object; and
   wherein said system uses said key generating procedure to generate a key when the stored object's key has not been previously referenced, and uses the key retrieval procedure to obtain the key when the stored object's key has been previously referenced.

2. The system of claim 1,
   wherein the key is a hashcode.

3. The system of claim 1,
   wherein said key retrieval procedure further comprises
      a first key retrieval procedure that includes instructions for retrieving the key through the stored object's methods pointer when the key is stored external to the stored object; and
      a second key retrieval procedure that includes instructions for retrieving the key from the stored object when the key is stored at the predefined location within the stored object.

4. An object-oriented computer system for providing a hashcode for an object, comprising:
   a primary memory for storing a plurality of objects and a plurality of threads, a subset of said threads each including instructions that reference at least one object at least once;
   a hashcode generating procedure for generating a hashcode for an object that does not have a hashcode associated therewith, the hashcode identifying the specified object with respect to all other objects;
   a first hashcode storing procedure for storing the hashcode of an object being referenced by at least one thread of execution, said first hashcode storing procedure storing the hashcode generated from the hashcode generating procedure in a temporary memory location, external to said object, in said primary memory;
   a second hashcode storing procedure for storing the hashcode of an object having a hashcode stored external to said object and that is not referenced by any threads of execution, said second hashcode storing procedure resizing the object so as to include additional room for storage of the hashcode therein and storing the hashcode from said temporary memory location external to said object to a location internal to the object; and
   a hashcode retrieving procedure for retrieving the hashcode of a specified object.

5. The computer system of claim 4,
   wherein said second hashcode storing procedure releases the temporary memory location used to store the hashcode.

6. The computer system of claim 4,
   wherein said hashcode retrieving procedure further comprises
      a first hashcode retrieving procedure for retrieving the hashcode of the specified object from the temporary memory location outside the specified object; and
      a second hashcode retrieving procedure for retrieving the hashcode of the specified object from the location internal to the specified object.

7. A computer system, comprising:
   a memory for storing a plurality of objects and a plurality of procedures, each stored object having a methods pointer to a subset of said procedures;
   a first global hashing procedure, including instructions for creating a local object hashing procedure for a specified object, each local object hashing procedure including a respective object's hashcode and instructions for retrieving the respective object's hashcode;
   a hashcode cleanup procedure comprising instructions for releasing the specified object's local object hashing procedure when predefined release criteria are satisfied; and wherein said system uses said first global hashing procedure to service requests for the hashcodes of objects that do not have hashcodes and uses said local object hashing procedure to service requests for the hashcodes of objects having local object hashing procedures.

8. The computer system of claim 7, each stored object that does not have a hashcode including a methods pointer to a subset of said procedures that includes said first global hashing procedure;

each stored object that has a local object hashing procedure including a methods pointer to a subset of said procedures that includes said local object hashing procedure; and said first global hashing procedure including instructions for updating the specified object's methods pointer to point to the subset of the procedures that includes the local object hashing procedure.

9. The computer system of claim 7, a second global hashing procedure comprising instructions for retrieving the hashcode of a stored object whose hashcode is stored with the object; and wherein said hashcode cleanup procedure further comprises instructions for storing the hashcode of an object, whose hashcode is accessible by its local object hashing procedure, with the object; and wherein said system uses said second global hashing procedure to service requests for the hashcodes of objects having hashcodes stored with the object.

10. The computer system of claim 9, each stored object that has a hashcode stored with the object including a methods pointer to a subset of the procedures that includes said second global hashing procedure;

each stored object that has a local object hashing procedure including a methods pointer to a subset of the procedures that includes said local object hashing procedure; and said hashcode cleanup procedure including instructions for updating the methods pointer of an object having a local object hashing procedure to point to the subset of the procedures that includes said second global hashing procedure.

11. The computer system of claim 7, said memory further storing a set of object classes, each object class including a primary virtual function table (VFT) that includes pointers referencing a set of methods associated with said object class as well as a pointer that references said first global hashing procedure;

each of said stored objects that has no hashcode including a methods pointer that references said primary VFT for a corresponding one of said object classes;

for each of said stored objects that has a local object hashing procedure, a local virtual function table (VFT) that includes a pointer referencing said local object hashing procedure; and said first global hashing procedure including instructions for updating said specified object's methods pointer to reference said local VFT for the specified object.

12. The computer system of claim 9, said memory further storing a set of object classes, each object class including a secondary virtual function table (VFT) that includes pointers referencing a set of methods associated with said object class as well as a pointer that references said second global hashing procedure;

each of said stored objects that has a hashcode stored with the object including a methods pointer that references said secondary VFT for a corresponding one of said object classes;

for each of said stored objects that has a local object hashing procedure, a local virtual function table (VFT) that includes a pointer referencing said local object hashing procedure; and said hashcode cleanup procedure further comprising instructions for updating the methods pointer of an object having a local object hashing procedure to reference said secondary VFT.

13. In an object-oriented computer system, a method for providing a key for an object, said method comprising the steps of:

storing a plurality of objects and a plurality of procedures in a memory in respective memory locations, each stored object having a methods pointer to a subset of said procedures;

when requesting a key for a specified object that does not have a key, determining the key for the specified object that identifies the specified object with respect to all other stored objects, and storing the specified object's key in a memory location external to the specified object and accessible by the specified object's methods pointer;

when relocating the memory location of a stored object having an associated key stored in a memory location external to the stored object, wherein the associated key is accessible through the stored object's methods pointer, resizing the stored object so as to include additional room for storage of the associated key therein and storing the associated key at a predefined location within the stored object; and providing a key retrieval procedure which includes instructions for retrieving a key of an object.

14. The method of claim 13, wherein the key is a hashcode.

15. The method of claim 13, wherein said key retrieval procedure further comprises:

a first key retrieval procedure that includes instructions for retrieving the key of an object through the object's methods pointer when the key is stored external to the object; and a second key retrieval procedure that includes instructions for retrieving the key from the object when the key is stored at the predefined location within the object.

16. In an object-oriented computer system, a method for retrieving a hashcode for an object, said method comprising the steps of:

providing in a memory a plurality of objects and a plurality of threads, a subset of said threads each including instructions that reference at least one of the objects at least once;

when a hashcode is requested for a specific object not having a hashcode, generating a hashcode for the specific object; said specific object having a methods pointer to set of procedures:

when the specific object is referenced by at least one thread, storing the hashcode generated in said generating step in a temporary memory location external to the specific object;

when the specific object is not referenced by any threads, relocating and resizing the object so as to include additional room for storage of the hashcode therein and storing the hashcode, from the temporary memory location, to a predefined location within the object; and retrieving the hashcode for the specific object; wherein the hashcode is accessible through the specific object's methods pointer both when the hashcode is stored in the temporary location external to the specific object and when the hashcode is stored at the predefined location within the specific object.

17. A method of operating a computer system, comprising the steps of:

storing in a computer memory a plurality of objects and a plurality of procedures, each stored object including a methods pointer to a subset of said procedures;

when servicing a request on a specified object that does not have a hashcode, executing a first global hashing procedure that includes instructions for creating a local object hashing procedure for the specified object, each local object hashing procedure including a hashcode and instructions for retrieving the specified object's hashcode from the local object hashing procedure; and and when predefined release criteria are satisfied, executing a hashcode cleanup procedure comprising instructions to release a specified object's local object hashing procedure.

18. The method of claim 17, associating with each stored object that does not have a hashcode, a methods pointer to a subset of the procedures that includes the first global hashing procedure;

associating with each stored object that has a local object hashing procedure, a methods pointer to a subset of the procedures that includes the local object hashing procedure; and when executing the first global hashing procedure to retrieve a hashcode for a specified object having no hashcode, updating the specified object's methods pointer to point to the subset of the procedures that includes the local object hashing procedure.

19. The method of claim 17, wherein said hashcode cleanup procedure further comprises instructions to store the hashcode of a stored object having a local object hashing procedure with the stored object; and when servicing a request for the hashcode of the stored object, executing a second global hashing procedure that includes instructions for retrieving the hashcode stored with the stored object.

20. The method of claim 17, storing in said computer memory a set of object classes, each object class including a primary virtual function table (VFT) that includes pointers referencing a set of methods associated with said object class as well as a pointer that references the first global hashing procedure;

associating with each of the stored objects that does not have a hashcode, a methods pointer that references the primary VFT for a corresponding one of the object classes;

for each of the stored objects that has a local object hashing procedure, storing in said computer memory a local virtual function table (VFT) that includes a pointer referencing the local object hashing procedure; and when executing the first global hashing procedure, updating the specified object's methods pointer to reference the local VFT for the specified object.

21. The method of claim 19, storing in said computer memory a set of object classes, each object class including a secondary virtual function table (VFT) that includes pointers referencing a set of methods associated with said object class as well as a pointer that references the second global object hashing procedure;

associating with each of the stored objects that has a hashcode stored with the object, a methods pointer that references the secondary VFT for a corresponding one of said object classes;

for each of the stored objects that has a local object hashing procedure, storing in said computer memory a local virtual function table (VFT) that includes a pointer referencing the local object hashing procedure; and when executing the hashcode cleanup procedure, updating the methods pointer of an object having its hashcode stored with the object to reference the secondary VFT.

22. A computer program product for use in conjunction with a data processing system, said data processing system storing a plurality of objects and a plurality of procedures, each stored object including a methods pointer to a subset of the procedures, the computer program product comprising a computer readable storage medium and a computer program mechanism embedded therein, the computer program mechanism comprising:

a key generating procedure for generating a key for a specific object that does not have a key associated therewith, the key identifying the specified object with respect to all other objects, said key generating procedure storing the key in an electronic storage location external to the specific object and accessible through the specified object's methods pointer;

a key cleanup procedure for relocating stored objects to an alternate electronic storage location, said key cleanup procedure including instructions for resizing a stored object having an associated key stored in an electronic storage location external to the stored object, wherein the associated key is accessible through the stored object's methods pointer, the object being resized so as to include additional room for storage of the associated key in the stored object, and instructions for storing the associated key at a predefined location within the stored object; and a key retrieval procedure for retrieving a key of a stored object.

23. The computer program product of claim 22, wherein the key is a hashcode.

24. The computer program product of claim 22, wherein said key retrieval procedure further comprises:

a first key retrieval procedure for retrieving the key of the stored object from the electronic storage location accessible through the stored object's methods pointer when the key is stored external to the stored object; and a second key retrieval procedure for retrieving the key of a stored object from the stored object when the key is stored at the predefined location within the stored object.

25. In a data processing system, a set of computer-readable modules suitable for transmission over a communications link to other data processing systems, said set comprising:

a key generating module for generating a key for a specific object that does not have a key associated therewith, the key identifying the specified object with respect to all other objects, said key generating procedure storing the key in a memory location external to the specific object and accessible through the specified object's methods pointer;

a key cleanup module for relocating stored objects to an alternate memory location, said key cleanup procedure including instructions for resizing a stored object having an associated key stored in a memory location external to the stored object, wherein the associated key is accessible through the stored object's methods pointer, the object being resized so as to include additional room for storage of the associated key in the stored object, and instructions for storing the associated key at a predefined location within the stored object; and a key retrieval module for retrieving a key of a stored object.

26. The set of computer-readable modules of claim 25, wherein the key is a hashcode.

27. The set of computer-readable modules of claim 25, wherein said key retrieval procedure further comprises:

a first key retrieval procedure for retrieving the key of the stored object from the electronic storage location accessible through the stored object's methods pointer when the key is stored external to the stored object; and a second key retrieval procedure for retrieving the key of a stored object from the stored object when the key is stored at the predefined location within the stored object.

* * * * *